United States Patent
Lee et al.

(10) Patent No.: US 9,113,465 B2
(45) Date of Patent: Aug. 18, 2015

(54) METHOD AND APPARATUS OF RESOURCE ALLOCATION FOR MACHINE TYPE COMMUNICATION DEVICE, METHOD AND APPARATUS FOR RECEIVING DATA FOR MACHINE TYPE COMMUNICATION

(71) Applicant: Electronics and Telecommunications Research Institute, Daejeon (KR)

(72) Inventors: Moon Sik Lee, Daejeon (KR); Young Seog Song, Daejeon (KR); Jun Hwan Lee, Seoul (KR); Il Gyu Kim, Chungbuk (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 78 days.

(21) Appl. No.: 13/715,400

(22) Filed: Dec. 14, 2012

(65) Prior Publication Data

US 2013/0163556 A1   Jun. 27, 2013

(30) Foreign Application Priority Data

Dec. 26, 2011 (KR) .................. 10-2011-0142006
Jul. 3, 2012 (KR) .................. 10-2012-0072328

(51) Int. Cl.
*H04W 4/00* (2009.01)
*H04W 72/04* (2009.01)
*H04J 4/00* (2006.01)
*H04L 5/00* (2006.01)

(52) U.S. Cl.
CPC ............. *H04W 72/0446* (2013.01); *H04J 4/00* (2013.01); *H04L 5/0007* (2013.01); *H04L 5/0037* (2013.01); *H04L 5/0044* (2013.01); *H04L 5/0053* (2013.01); *H04W 4/005* (2013.01)

(58) Field of Classification Search
None
See application file for complete search history.

(56) References Cited

U.S. PATENT DOCUMENTS

| 2009/0022235 | A1  | 1/2009  | Zhang et al. |
| 2011/0268046 | A1* | 11/2011 | Choi et al. ................... 370/329 |
| 2012/0327894 | A1* | 12/2012 | Axmon et al. ................ 370/330 |
| 2012/0327895 | A1* | 12/2012 | Wallen et al. ................. 370/330 |
| 2013/0077584 | A1* | 3/2013  | Lee et al. ...................... 370/329 |
| 2013/0083753 | A1* | 4/2013  | Lee et al. ...................... 370/329 |
| 2013/0100900 | A1* | 4/2013  | Lee et al. ...................... 370/329 |
| 2013/0114570 | A1* | 5/2013  | Park et al. ..................... 370/335 |
| 2013/0135984 | A1* | 5/2013  | Choi et al. .................... 370/209 |
| 2013/0155974 | A1* | 6/2013  | Papasakellariou et al. ... 370/329 |
| 2013/0286957 | A1* | 10/2013 | Bucknell et al. .............. 370/329 |
| 2014/0010335 | A1* | 1/2014  | Lee et al. ...................... 375/347 |
| 2014/0079011 | A1* | 3/2014  | Wiberg et al. ................ 370/329 |
| 2014/0133430 | A1* | 5/2014  | Yang et al. .................... 370/329 |
| 2014/0161088 | A1* | 6/2014  | Seo et al. ...................... 370/329 |
| 2014/0169319 | A1* | 6/2014  | Yang et al. .................... 370/329 |

FOREIGN PATENT DOCUMENTS

KR    1020110104497    9/2011
KR    1020120010203    2/2012

* cited by examiner

*Primary Examiner* — Anh-Vu Ly
(74) *Attorney, Agent, or Firm* — Nelson Mullins Riley & Scarborough, LLP

(57) ABSTRACT

Disclosed herein relates to a resource allocation method for a machine type communication (MTC) device. The resource allocation method for the MTC device includes allocating a control channel with respect to a user terminal to a first time domain of a sub frame, and mixing at least one of a control channel with respect to the at least one MTC device, a data channel with respect to the user terminal, and a data channel with respect to the MTC device in a second time domain of the sub frame, and allocating the mixed channel to the second time domain of the sub frame. Accordingly, in a wireless communication system, control information and data may be transmitted and received to and from the MTC device while maintaining compatibility with the user terminal.

10 Claims, 11 Drawing Sheets

METHOD AND APPARATUS OF RESOURCE ALLOCATION FOR MACHINE TYPE COMMUNICATION DEVICE, METHOD AND APPARATUS FOR RECEIVING DATA FOR MACHINE TYPE COMMUNICATION

CLAIM FOR PRIORITY

This application claims priority to Korean Patent Application No. 10-2011-0142006 filed on Dec. 26, 2011 and Korean Patent Application No. 10-2012-0072328 filed on Jul. 3, 2012 in the Korean Intellectual Property Office (KIPO), the entire contents of which are hereby incorporated by reference.

BACKGROUND

1. Technical Field

Example embodiments of the present invention relate in general to machine type communication (MTC), and more specifically, to a resource allocation method and apparatus for an MTC device in a mobile communication system, and to a method and apparatus for receiving MTC data.

2. Related Art

Machine type communication (MTC) or machine to machine communication denotes a type of data communication associated with at least one entity that does not necessarily require human intervention.

Services that are optimized for MTC are different from services that are optimized for human-to-human communication, and are characterized differently from current mobile network communication in that the services are associated with characteristics such as a) a variety of market scenarios, b) data communication, c) lower costs and effort, d) a significantly large number of potential terminals that communicate, and e) a significantly small amount of traffic for each terminal up to a large range.

MTC may be exhibited in the form of various services, and as examples of the various services, smart metering, tracking and tracing, remote maintenance and control, e-Health, and the like, may be given.

In current 3rd generation partnership project (3GPP), standardization of MTC for intelligent communication in human-to-object and object-to-object is in progress. A large number of MTC devices are disposed and operated for a variety of MTC applications which have main functions such as smart metering, remote control, and the like.

In a 3GPP LTE system, an MTC device or a general terminal are all treated as a single User Equipment (UE), and should be individually registered in an LTE network. Disposition of such a large number of MTC devices may cause scheduling competition for channel allocation, depletion of wireless resources, overload due to occurrence of signals, or the like, and therefore negative influence may be exerted on existing general terminals.

In addition, in the 3GPP LTE system, UE may be connected to a base station (eNodeB) having a bandwidth such as 1.4 MHz, 3 MHz, 5 MHz, 10 MHz, 15 MHz, or 20 MHz, but the MTC device generally transmits a small amount of data. Accordingly, supporting a bandwidth up to 20 MHz to the MTC device in the same manner as that in the UE is a waste of resources, and this leads to a significant waste of costs in the MTC device aiming for low costs.

SUMMARY

Accordingly, example embodiments of the present invention are provided to substantially obviate one or more problems due to limitations and disadvantages of the related art.

Example embodiments of the present invention provide a resource allocation method for a machine type communication (MTC) which may have a narrow bandwidth while maintaining compatibility with a user terminal.

Example embodiments of the present invention provide a resource allocation apparatus for an MTC device which may have a narrow bandwidth while maintaining compatibility with a user terminal.

Example embodiments of the present invention provide a method for receiving MTC data which may have a narrow bandwidth while maintaining compatibility with a user terminal.

Example embodiments of the present invention provide an apparatus for receiving MTC data which may have a narrow bandwidth while maintaining compatibility with a user terminal.

In some example embodiments, a method for allocating resources to at least one machine type communication (MTC) device includes: allocating a control channel with respect to a user terminal to a first time domain of a sub frame; and mixing at least one of a control channel with respect to the at least one MTC device, a data channel with respect to the user terminal, and a data channel with respect to the MTC device in a second time domain of the sub frame, and allocating the mixed channel to the second time domain of the sub frame.

Here, the control channel for the MTC device and the data channel with respect to the MTC device may be divided by the data channel with respect to the user terminal and a frequency division multiplexing (FDM) manner.

In addition, the control channel with respect to the MTC device may be divided by the data channel with respect to the MTC device and any one of a time division multiplexing (TDM) manner, an FDM manner, and combination of TDM and FDM.

In addition, the method may further include transmitting, to the MTC device, information about a region occupied by the control channel with respect to the MTC device.

In addition, the transmitting may transmit the information about the region occupied by the control channel with respect to the MTC device to the at least one MTC device through any one of upper layer signaling higher than a physical layer, a broadcast channel with respect to the user terminal for transmitting system information to the user terminal, and a separate physical control channel for the MTC device.

Here, the information about the region occupied by the control channel with respect to the MTC device may include at least one of a start symbol number and an end symbol number of the control channel with respect to the MTC device, a start symbol number of the data channel with respect to the MTC device, the number of symbols occupied by the control channel with respect to the MTC device, the number of resource blocks (RB), the number of subcarriers, the number of subcarrier groups, the number of resource block groups, and a configuration index.

In other example embodiments, an apparatus for allocating resources to at least one MTC device includes: a resource allocation unit that allocates a control channel with respect to a user terminal to a first time domain of a sub frame, mixes at least one of a control channel with respect to the at least one MTC device, a data channel with respect to the user terminal, and a data channel with respect to the MTC device in a second time domain of the sub frame, and allocates the mixed channel to the second time domain of the sub frame.

Here, the apparatus may further include a transmission unit that transmits, to the MTC device, information about a region occupied by the control channel with respect to the MTC device.

Here, the transmission unit may transmit the information about the region occupied by the control channel with respect to the MTC device to the at least one MTC device through any one of upper layer signaling higher than a physical layer, a broadcast channel with respect to the user terminal for transmitting system information to the user terminal, and a separate physical control channel for the MTC device.

In still other example embodiments, a method for receiving MTC data from a base station includes receiving information about a region occupied by a control channel with respect to an MTC device through any one of upper layer signaling higher than a physical layer, a broadcast channel with respect to a user terminal for transmitting system information from the base station to the user terminal, and a separate physical control channel for the MTC device; and receiving the MTC data based on the information about the region occupied by the control channel with respect to the MTC device.

Here, the information about the region occupied by the control channel with respect to the MTC device may include at least one of a start symbol number and an end symbol number of the control channel with respect to the MTC device, a start symbol number of the data channel with respect to the MTC device, the number of symbols occupied by the control channel with respect to the MTC device, the number of resource blocks (RB), the number of subcarriers, the number of subcarrier groups, the number of resource block groups, and a configuration index.

In yet other example embodiments, an apparatus for receiving MTC data from a base station includes: a reception unit that receives information about a region occupied by a control channel with respect to an MTC device through any one of upper layer signaling higher than a physical layer, a broadcast channel with respect to a user terminal for transmitting system information from the base station to the user terminal, and a separate physical control channel for the MTC device; and a control unit that receives the MTC data based on the information about the region occupied by the control channel with respect to the MTC device.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
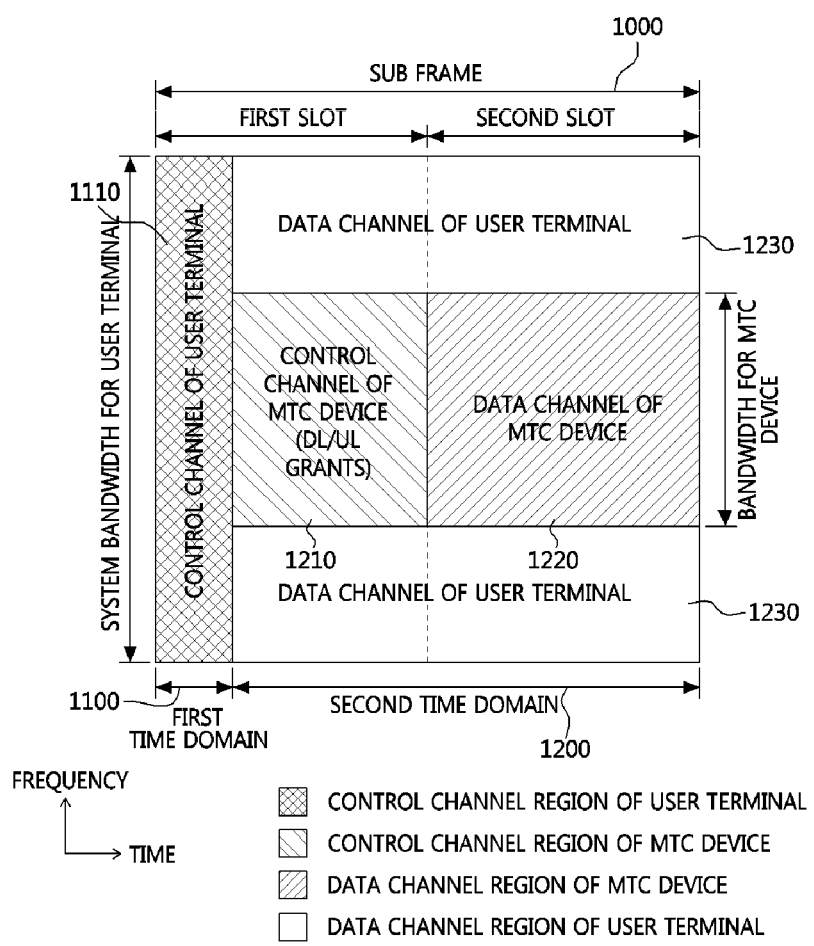
FIG. 1 is a conceptual diagram illustrating a structure of a sub frame that may transmit control information and data for a machine type communication (MTC) device while maintaining compatibility with a user terminal according to an embodiment of the present invention.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Embodiments of the present invention in the present specification will be described focusing on resource allocation for data transmission/reception between a base station and a user terminal and between a base station and a machine type communication (MTC) device, and the base station may be a terminal node of a network directly communicating with the user terminal and the MTC device. In addition, in the present specification, a specific operation which is described as being performed by the base station may be performed by an upper node of the base station, as necessary.

In the present specification, the base station may be replaced with the term such as a fixed station, a Node B, eNode B (eNB), access point, or the like, and the user terminal may be replaced with the term such as a mobile station (MS), user equipment (UE), a subscriber station (SS), a mobile subscriber station (MSS), a mobile terminal, or the like. The mobile terminal may be a variety of devices such as a personal digital assistant (PDA), a cellular phone, a personal communication service (PCS) phone, a global system for mobile (GSM) phone, a wideband code division multiple access (WCDMA) phone, a mobile broadband system (MBS) phone, or the like. In addition, the number of machine application types of the MTC device are increased, and as examples of the machine application types, security, public safety, tracking and tracing, payment, healthcare, remote maintenance and control, metering, consumer device, fleet management in point of sales (POS) and security-related application market, device-to-device communication of vending machines, remote monitoring of machines and equipment, operating time measurement in construction mechanical equipment and smart metering such as automatically measuring heat or electricity consumption, surveillance video communication of a surveillance camera, and the like, may be given, but the present invention is not limited thereto. The MTC device may be a variety of devices that may perform application types other than the above-described machine application types.

Meanwhile, the embodiments of the present invention may be implemented by a variety of means such as hardware, firmware, software, or a combination thereof. The hardware may be implemented through at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

The firmware or the software may be implemented in the form of modules, procedures, or functions which may perform functions or operations. Here, a software code may be carried out by a processor stored in a memory device, and the memory device may be positioned inside or outside the processor to thereby transmit and receive data with the processor by a variety of means.

Meanwhile, a data channel of a user terminal described in the present specification may refer to a channel which a base station uses in order to transmit data with respect to the user terminal, and for example, may mean a physical downlink shared channel (PDSCH) which is specified in 3GPP LTE-based wireless communication standards.

In addition, a data channel of an MTC device may refer to a channel which a base station uses in order to transmit data with respect to an MTC device, and for example, may mean that a PDSCH or the like, which is specified in the 3GPP LTE-based wireless communication standards, is used as a channel (MTC-PDSCH) for the MTC device.

In addition, a control channel of a user terminal described in the present specification may refer to a channel which a base station uses in order to transmit, to a user terminal, control information for demodulating a data channel (for example, PDSCH specified in the 3GPP LTE-based wireless communication standards) with respect to the user terminal, and for example, may mean a physical downlink control channel (PDCCH) which is described in the 3GPP LTE-based wireless communication standards.

In addition, a control channel of an MTC device may refer to a channel that a base station uses in order to transmit, to the MTC device, control information for demodulating a data channel with respect to the MTC device, and for example, may mean that a PDCCH specified in the 3GPP LTE-based wireless communication standards is used as a channel (MTC-PDSCH) for an MTC device.

In addition, a control format indicator channel of a user terminal which is described in the present specification may refer to a channel that transmits information about the number of orthogonal frequency division multiplexing (OFDM) symbols occupied by a control channel with respect to a user terminal, and for example, may mean a physical control format indicator channel (PCFICH) which is specified in the 3GPP LTE-based wireless communication standards.

In addition, a control format indicator channel of an MTC device may refer to a channel that transmits information about the number of OFDM symbols occupied by a control channel with respect to an MTC device, and for example, may mean that a PCFICH specified in the 3GPP LET-based wireless communication standards is used as a channel (MTC-PCFICH) for an MTC device.

In addition, a hybrid automatic repeat request (HARQ) indicator channel of a user terminal which is described in the present specification, may refer to a channel that transmits acknowledgement/negative acknowledgement (ACK/NACK) information about an upper link of a data channel with respect to a user terminal, and for example, may mean a physical hybrid-ARQ indicator channel (PHICH) specified in the 3GPP LTE-based wireless communication standards.

In addition, an HARQ indicator channel of an MTC device may refer to a channel that transmits ACK/NACK information about an upper link of a data channel with respect to an MTC device, and for example, may mean that a PHICH specified in the 3GPP LTE-based wireless communication standards is used as a channel (MTC-PHICH) for an MTC device.

In addition, a broadcast channel of a user terminal which is described in the present specification, may refer to a channel which a base station uses in order to transmit system information to a plurality of user terminals, and for example, may mean a physical broadcasting channel (PBCH) that is specified in the 3GPP LTE-based wireless communication standards.

In addition, a broadcast channel of an MTC device may refer to a channel which a base station uses in order to transmit system information to a plurality of MTC devices, and for example, may mean that a PBCH specified in the 3GPP LTE-based wireless communication standards is used as a channel (MTC-PBCH) for an MTC device.

Hereinafter, embodiments of the present invention may allocate a downlink physical channel only for an MTC device in which a base station may transmit control information and data information for an MTC device while maintaining compatibility with a user terminal. In addition, the embodiments of the present invention may allocate a physical channel for an MTC device to a predetermined specific location within a sub frame, or variably allocate a physical channel to a variety of locations.

According to a resource allocation method and apparatus for an MTC device according to the present invention and a method and apparatus for receiving MTC data according to the present invention, in a wireless communication system such as a 3GPP LTE-based mobile communication system, control information and data may be transmitted to an MTC device while maintaining compatibility with a user terminal to thereby provide MTC services.

Hereinafter, preferred embodiments of the present invention will be described in detail with reference to the accompanying drawings.

FIG. 1 is a conceptual diagram illustrating a structure of a sub frame that may transmit control information and data for a machine type communication (MTC) device while maintaining compatibility with a user terminal according to an embodiment of the present invention.

Referring to FIG. 1, a horizontal direction of a sub frame 1000 denotes a time axis, and a vertical direction thereof denotes a frequency axis. The sub frame 1000 includes a predetermined number of symbols along the time axis, and occupies a predetermined bandwidth along the frequency axis. Here, each region of the sub frame 1000 may denote a wireless resource determined in time and frequency domains.

A control channel 1110 of a user terminal for transmitting control information to the user terminal by a base station may be allocated to a first time domain 1100 of the sub frame 1000, and a control channel 1210 of an MTC device for transmitting control information to an MTC device by a base station and a data channel 1220 of an MTC device for transmitting data to an MTC device by a base station may be allocated to a second time domain 1200 of the sub frame 1000. In addition, the control channel 1210 of the MTC device may be allocated to a first slot, and the data channel 1220 of the MTC device may be allocated to a second slot.

In addition, the control channel 1210 of the MTC device and the data channel 1220 of the MTC device which are allocated to the second time domain 1200 of the sub frame 1000, may be divided by a data channel 1230 of a user terminal and a frequency division multiplexing (FDM) manner as shown in FIG. 1, and the control channel 1210 of the MTC device may be divided by the data channel 1220 of the MTC device and a time division multiplexing (TDM) manner.

In addition, a final symbol of the control channel 1210 of the MTC device may be fixed in a final symbol of the first slot to thereby be allocated.

Meanwhile, as shown in FIG. 1, control information (DL grants) about downlink resource allocation of the data channel 1220 of the MTC device, and control information (UL grants) about uplink resource allocation of the data channel 1220 of the MTC device may be transmitted together to the control channel 1210 of the MTC device.

In addition, the control channel 1210 of the MTC device may be divided into a first control channel of the MTC device for transmitting control information (DL grants) about downlink resource allocation of the data channel 1220 of the MTC device, and a second control channel of the MTC device for transmitting control information (UL grants) about uplink resource allocation of the data channel 1220 of the MTC device to thereby be allocated.

Figure 2:
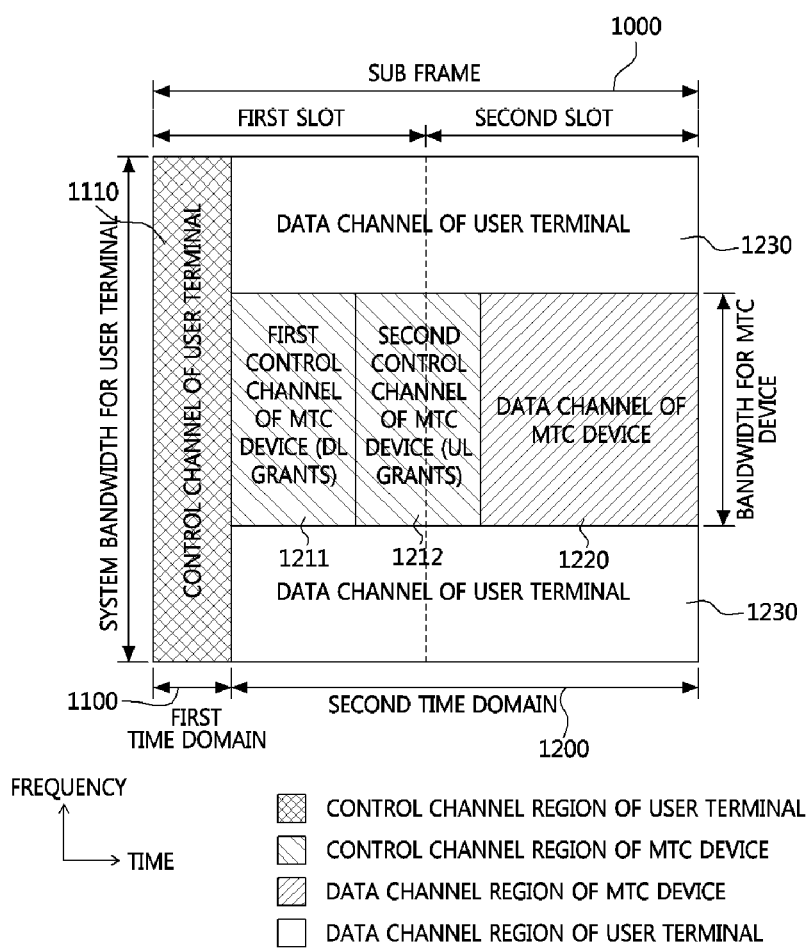
FIG. 2 is a conceptual diagram illustrating another structure of a sub frame that may transmit control information and data for an MTC device while maintaining compatibility with a user terminal according to an embodiment of the present invention.

FIG. 2 is a conceptual diagram illustrating another structure of a sub frame that may transmit control information and data for an MTC device while maintaining compatibility with a user terminal according to an embodiment of the present invention.

Referring to FIG. 2, in the same manner as that of FIG. 1, a horizontal direction of the sub frame 1000 denotes a time axis, and a vertical direction thereof denotes a frequency axis. The sub frame 1000 includes a predetermined number of symbols along the time axis, and occupies a predetermined bandwidth along the frequency axis. Here, each region of the sub frame 1000 may denote a wireless resource determined in time and frequency domains.

A control channel 1110 of a user terminal for transmitting control information to a user terminal by a base station may be allocated to a first time domain 1100 of the sub frame 1000, and a control channel 1210 of an MTC device for transmitting control information to the MTC device by a base station and a data channel 1220 of an MTC device for transmitting data to the MTC device by a base station may be allocated to a second time domain 1200 of the sub frame 1000. In addition, the control channel 1210 of the MTC device may be allocated over a first slot and a second slot.

In addition, the control and data channels 1210 and 1220 of the MTC device of the second time domain 1200 of the sub frame 1000 may be divided by the data channel 1230 of the user terminal and an FDM manner as shown in FIG. 2, and the control channel 1210 of the MTC device may be divided by the data channel 1220 of the MTC device and a TDM manner.

Meanwhile, as shown in FIG. 2, the control channel 1210 of the MTC device may be divided into a first control channel 1211 of the MTC device for transmitting control information (DL grants) about downlink resource allocation of the data channel 1220 of the MTC device, and a second control channel 1212 of the MTC device for transmitting control information (UL grants) about uplink resource allocation of the data channel of the MTC device to thereby be allocated.

Figure 3:
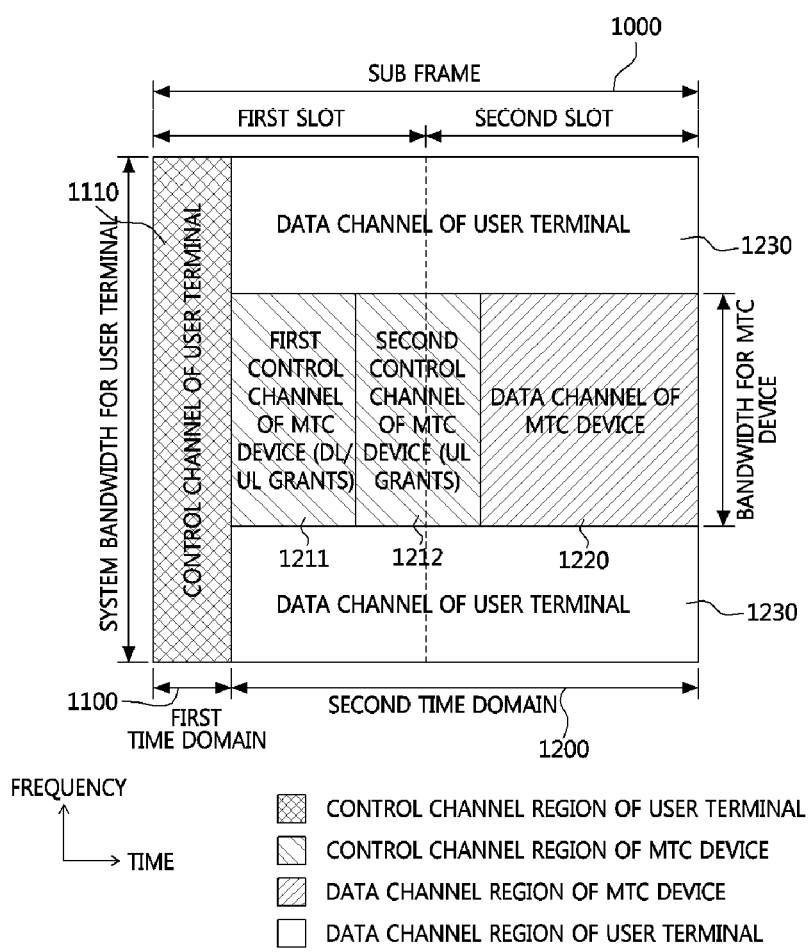
FIG. 3 is a conceptual diagram illustrating still another structure of a sub frame that may transmit control information and data for an MTC device while maintaining compatibility with a user terminal according to an embodiment of the present invention.

FIG. 3 is a conceptual diagram illustrating still another structure of a sub frame that may transmit control information and data for an MTC device while maintaining compatibility with a user terminal according to an embodiment of the present invention.

Referring to FIG. 3, in the same manner as that of FIG. 1 or 2, a horizontal direction of the sub frame 1000 denotes a time axis, and a vertical direction thereof denotes a frequency axis. The sub frame 1000 includes a predetermined number of symbols along the time axis, and occupies a predetermined bandwidth along the frequency axis. Here, each region of the sub frame 1000 may denote a wireless resource determined in time and frequency domains.

A control channel 1110 of a user terminal for transmitting control information to a user terminal by a base station may be allocated to a first time domain 1100 of the sub frame 1000, and a control channel 1210 of the MTC device for transmitting control information to an MTC device by a base station and a data channel 1220 of an MTC device for transmitting data to an MTC device by a base station may be allocated to a second time domain 1200 of the sub frame 1000.

In addition, the control channel 1210 of the MTC device may be allocated over a first slot and a second slot.

In addition, the control channel 1210 of the MTC device and the data channel 1220 of the MTC device may be divided by the data channel 1230 of the user terminal and the FDM manner as shown in FIG. 3, and the control channel 1210 of the MTC device may be divided by the data channel 1220 of the MTC device and the TDM manner.

Meanwhile, as shown in FIG. 3, the control channel 1210 of the MTC device may be divided into a first control channel 1211 of the MTC device to which the control information (DL grants) about downlink resource allocation of the data channel 1220 of the MTC device and the control information (UL grants) about uplink resource allocation of the data channel 1220 of the MTC device are transmitted together, and a second control channel 1212 of the MTC device to which the control information (UL grants) about the uplink resource allocation of the data channel 1220 of the MTC device to thereby be allocated.

As shown in FIGS. 1 to 3, the control channel 1210 of the MTC device may be allocated to a predetermined region of the resource so as to transmit control information about the MTC device by a base station, and the data channel 1220 of the MTC device may be allocated to a predetermined region of the resource so as to transmit data about the MTC device, and therefore information about the region occupied by the control channel 1210 of the MTC device may be transmitted to the MTC device through semi-static signaling using upper layer signaling higher than a physical layer, transmitted to the MTC device using a broadcast channel of a user terminal for transmitting system information to a user terminal by a base station, or transmitted to the MTC device through dynamic signaling using a separate physical control channel for the MTC device.

Specifically, a case in which the information about the region occupied by the control channel 1210 of the MTC device is transmitted to the MTC device through the upper layer signaling higher than the physical layer will be described herein. When a base station allocates the sub frame 1000 in the same structure as that of FIG. 1, and a final symbol position of the control channel 1210 of the MTC device is fixed and allocated to a final symbol of the first slot, the information about the region occupied by the control channel 1210 of the MTC device may be a symbol number in which the control channel 1210 of the MTC device starts.

In addition, when a base station allocates the sub frame 1000 in the same structure as that of FIG. 1, and the final symbol position of the control channel 1210 of the MTC device is not fixed and allocated to the final symbol of the first slot, the information about the region occupied by the control channel 1210 of the MTC device may be a symbol number in which the control channel 1210 of the MTC device starts, and a symbol number in which the control channel 1210 of the MTC device is terminated.

Here, the symbol number in which the control channel 1210 of the MTC device is terminated may be replaced with a symbol number in which the data channel 1220 of the MTC device starts.

The following Table 1 shows an example of parameters that may become information about the region occupied by the control channel 1210 of the MTC device through the upper layer signaling higher than the physical layer when the final symbol position of the control channel 1210 of the MTC device is not fixed and allocated to the final symbol of the first slot.

TABLE 1

| Configuration index | Start symbol number of control channel of MTC device | End symbol number in which control channel of MTC device |
|---|---|---|
| 0 | 1 | 5 |
| 1 | 2 | 6 |
| 2 | 3 | 7 |
| 3 | 4 | 7 |
| • | • | • |

Table 1 shows an example of the parameters that may become the information about the region occupied by the control channel 1210 of the MTC device, and may use, as the parameters of the upper layer signaling, at least one of a start symbol number of the control channel 1210 of the MTC device, an end symbol number of the control channel 1210 of the MTC device, and a configuration index matched with the start symbol number and the end symbol number.

Accordingly, the base station may allocate the sub frame 1000 as shown in FIG. 1, and provide, to the MTC device, the information about the region occupied by the control channel 1210 of the MTC device through the upper layer signaling higher than the physical layer using at least one of the start symbol number of the control channel 1210 of the MTC device, the end symbol number of the control channel 1210 of the MTC device, and the configuration index.

In addition, when the final symbol position of the control channel 1210 of the MTC device is fixed and allocated to the final symbol of the first slot in FIG. 1, the end symbol number of the control channel 1210 of the MTC device in Table 1 may not be used.

Meanwhile, the following Table 2 shows an example of parameters that may become information about regions occupied by the first control channel 1211 of the MTC device and the second control channel 1212 of the MTC device, which is transmitted through the upper layer signaling higher than the physical layer in the sub frame 1000 described in FIG. 2 or 3.

TABLE 2

| Configuration index | Start symbol number of first control channel of MTC device | Start symbol number of second control channel of MTC device | End symbol number of second control channel of MTC device |
|---|---|---|---|
| 0 | 1 | 4 | 6 |
| 1 | 2 | 4 | 6 |
| 2 | 3 | 5 | 7 |
| 3 | 4 | 6 | 7 |
| • | • | • | • |

Referring to Table 2, as the parameters of the upper layer signaling, a start symbol number of the first control channel 1211 of the MTC device, a start symbol number of the second control channel 1212 of the MTC device, and an end symbol number of the second control channel of the MTC device, may be used.

In addition, as the parameters of the upper layer signaling, a configuration index matched with the start symbol number of the first control channel 1211 of the MTC device, the start symbol number of the second control channel 1212 of the MTC device, and the end symbol number of the second control channel 1212 of the MTC device may be used. Here, the end symbol number of the second control channel 1212 of the MTC device may be replaced with a symbol number in which the data channel 1220 of the MTC device starts.

Meanwhile, when a final symbol position of the second control channel 1212 of the MTC device is fixed and allocated to a final symbol of a first slot in FIGS. 2 and 3, the end symbol number of the second control channel 1212 of the MTC device in Table 2 may not be used.

Meanwhile, hereinafter, the case in which the information about the region occupied by the control channel 1210 of the MTC device is transmitted to the MTC device through dynamic signaling using a separate physical control channel for the MTC device, will be described in detail.

When a base station allocates the sub frame 1000 in the same structure as that of FIG. 1, and the final symbol position of the control channel 1210 of the MTC device is fixed and allocated to the final symbol of the first slot, the information about the region occupied by the control channel 1210 of the MTC device may be transmitted through a control format indicator channel of the MTC device.

Accordingly, the information about the region occupied by the control channel 1210 of the MTC device may be information about a region in which the control channel 1210 of the MTC device occupies from a symbol position where the control format indicator channel of the MTC device is detected to the final symbol of the first slot.

Meanwhile, the information about the region occupied by the control channel 1210 of the MTC device may be obtained by detecting the final symbol position of the first slot from the symbol position where the control channel 1210 of the MTC device is detected without transmitting the information about the region occupied by the control channel 1210 of the MTC device through the control format indicator channel of the MTC device.

When a base station allocates the sub frame 1000 in the same structure as that of FIG. 1, and the final symbol position of the control channel 1210 of the MTC device is not fixed and allocated to the final symbol of the first slot, the information about the region occupied by the control channel 1210 of the MTC device may be the symbol number in which the control channel 1210 of the MTC device is terminated, or the number of symbols occupied by the control channel 1210 of the MTC device. Here, the symbol number in which the control channel 1210 of the MTC device is terminated may be replaced with the symbol number in which the data channel 1220 of the MTC device starts.

The following Table 3 shows an example of parameters that become information about the region occupied by the control channel 1210 of the MTC device in FIG. 1 which may be transmitted through the control format indicator channel of the MTC device.

TABLE 3

| Configuration index | The number of symbols occupied by control channel of MTC device |
|---|---|
| 0 | 1 |
| 1 | 2 |
| 2 | 3 |
| 3 | 4 |
| • | • |

Table 3 shows an example of the parameters that may become the information about the region occupied by the control channel 1210 of the MTC device, and the information about the region occupied by the control channel 1219 of the MTC device may be transmitted to the MTC device through the control format indicator channel of the MTC device including at least one of the number of symbols occupied by the control channel 1210 of the MTC device and the configuration index matched with the number of symbols occupied by the control channel 1210 of the MTC device.

Meanwhile, the following Table 4 shows an example of parameters that become information about regions occupied by the first control channel 1211 of the MTC device and the second control channel 1212 of the MTC device, which may be transmitted through the control format indicator channel of the MTC device in the sub frame 1000 described in FIG. 2 or 3.

TABLE 4

| Configuration index | The number of symbols occupied by first control channel of MTC device | The number of symbols occupied by second control channel of MTC device |
|---|---|---|
| 0 | 1 | 1 |
| 1 | 1 | 2 |
| 2 | 1 | 3 |
| 3 | 2 | 1 |
| 4 | 2 | 2 |
| 5 | 2 | 3 |
| 6 | 3 | 1 |
| 7 | 3 | 2 |
| 8 | 3 | 3 |
| • | • | • |

Referring to Table 4, the information about regions occupied by the first control channel 1211 of the MTC device and the second control channel 1212 of the MTC device may be transmitted to the MTC device through the control format indicator channel including the number of symbols occupied by the first control channel 1211 of the MTC device or an end symbol number of the first control channel 1211 of the MTC device, the number of symbols occupied by the second control channel 1212 of the MTC device, or an end symbol number of the second control channel 1212 of the MTC device.

Alternatively, information about at least one of the number of symbols occupied by the first control channel 1211 of the MTC device and the configuration index matched with the number of symbols occupied by the second control channel 1212 of the MTC device, may be transmitted to the MTC device through the control format indicator channel of the MTC device. Here, the end symbol number of the second control channel 1212 of the MTC device may be replaced with the start symbol number of the data channel 1220 of the MTC device.

Meanwhile, when the final symbol position of the second control channel 1212 of the MTC device is fixed and allocated to the final symbol of the first slot in FIG. 2 or 3, the number of symbols occupied by the second control channel 1212 of the MTC device of Table 4 may not be used as the information about the region occupied by the second control channel 1212 of the MTC device.

In addition, when the second control channel 1212 of the MTC device for transmitting control information (UL grants) about uplink resource allocation of the data channel 1220 of the MTC device in the sub frame 1000 shown in FIG. 2 exists, and the first control channel 1211 of the MTC device for transmitting control information (DL grants) about downlink resource allocation of the data channel 1220 of the MTC device does not exist, the first control channel 1211 of the MTC device may be allocated to a region for the user terminal.

In addition, when the second control channel 1212 of the MTC device for transmitting control information (UL grants) about uplink resource allocation of the data channel 1220 of the MTC device in the sub frame 1000 shown in FIG. 3 exists, and the first control channel 1211 of the MTC device for transmitting control information (DL grants) about downlink resource allocation of the data channel 1220 of the MTC device together with the control information (UL grants) about the uplink resource allocation of the data channel 1220 of the MTC device does not exist, allocated resources for the MTC device other than the second control channel 1212 of the MTC device may be allocated to the region for the user terminal.

In addition, when the first control channel 1211 (see FIG. 2) of the MTC device for transmitting the control information (DL grants) about downlink resource allocation of the data channel 1220 of the MTC device in the sub frame 1000 shown in FIG. 2 or 3, or the first control channel 1211 (see FIG. 3) of the MTC device for transmitting the control information (DL grants) about downlink resource allocation of the data channel 1220 of the MTC device together with the control information (UL grants) about the uplink resource allocation of the data channel 1220 of the MTC device exist, and the second control channel 1212 of the MTC device for transmitting the control information (UL grants) about the uplink resource allocation of the data channel 1220 of the MTC device does not exist, the second control channel 1212 of the MTC device may be used as the data channel 1220 of the MTC device.

Here, information that the second control channel 1212 of the MTC device is not used should be notified in such a manner that the number of symbols occupied by the second control channel 1212 of the MTC device is made zero, or the start symbol number of the data channel 1220 of the MTC device is made the same as the start symbol number of the second control channel 1212 of the MTC device, and then this is transmitted to the MTC device through semi-static signaling using upper layer signaling high than a physical layer. Alternatively, the information that the second control channel 1212 of the MTC device is not used may be transmitted to the MTC device using a broadcast channel of the user terminal for transmitting system information to the user terminal by a base station, or may be transmitted to the MTC device through dynamic signaling using a separate physical control channel for the MTC device.

Figure 4:
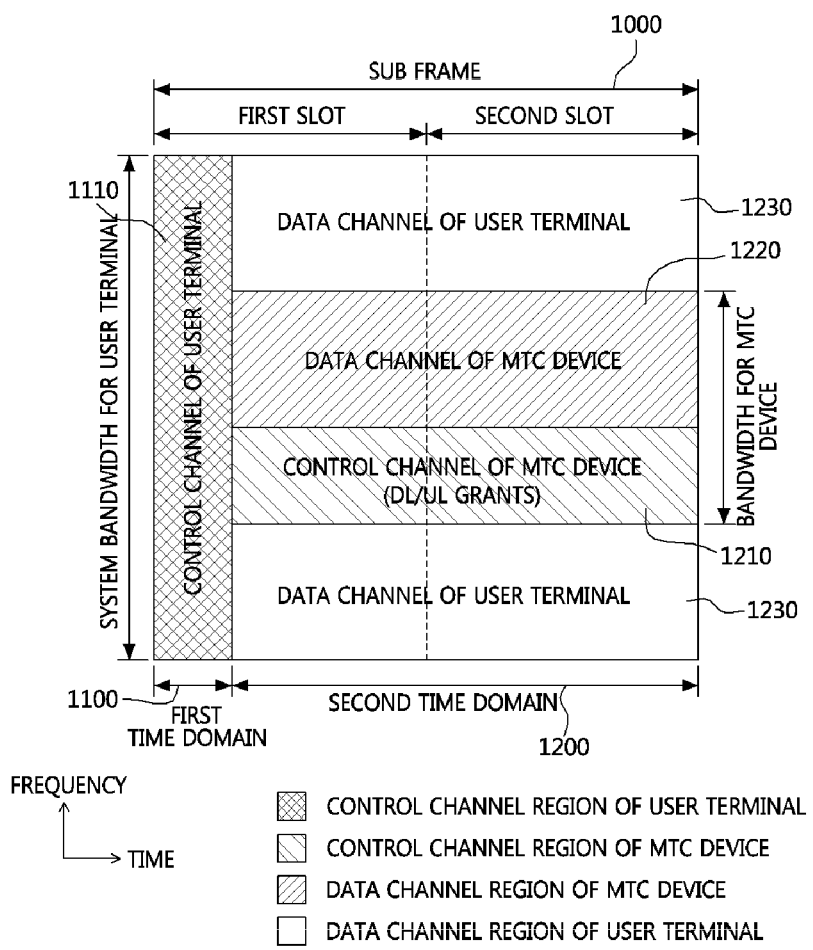
FIG. 4 is a conceptual diagram illustrating a structure of a sub frame that may transmit control information and data for an MTC device while maintaining compatibility with a user terminal according to an embodiment of the present invention.

FIG. 4 is a conceptual diagram illustrating a structure of a sub frame that may transmit control information and data for an MTC device while maintaining compatibility with a user terminal according to an embodiment of the present invention.

Referring to FIG. 4, a horizontal direction of the sub frame 1000 denotes a time axis, and a vertical direction thereof denotes a frequency axis. The sub frame 1000 includes a predetermined number of symbols along the time axis, and occupies a predetermined bandwidth along the frequency axis. Each region of the sub frame 1000 may denote a wireless resource determined in the time and frequency domains.

A control channel 1110 of a user terminal for transmitting control information to the user terminal by a base station may be allocated to a first time domain 1100 of the sub frame 1000, and a control channel 1210 of an MTC device for transmitting control information to the MTC device by a base station and a data channel 1220 of the MTC device for transmitting data to the MTC device by the base station may be allocated to a second time domain 1200 of the sub frame 1000.

In addition, the control channel 1210 of the MTC device and the data channel 1220 of the MTC device which are allocated to the second time domain 1200 of the sub frame 1000 may be divided by a data channel 1230 of the user terminal and the FDM manner as shown in FIG. 4, and the control channel 1210 of the MTC device may be divided by the data channel 1220 of the MTC device and the FDM manner.

Meanwhile, as shown in FIG. 4, the control channel 1210 of the MTC device may transmit control information (DL grants) about downlink resource allocation of the data channel 1220 of the MTC device together with control information (UL grants) about uplink resource allocation of the data channel 1220 of the MTC device.

Figure 5:
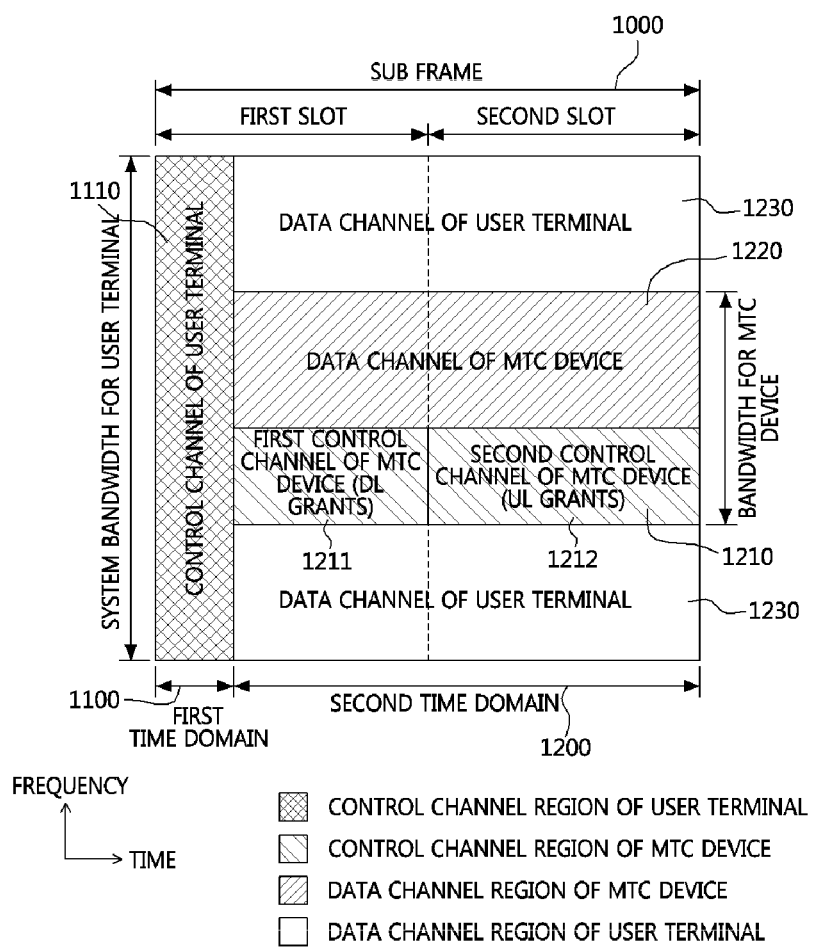
FIG. 5 is a conceptual diagram illustrating another structure of a sub frame that may transmit control information and data for an MTC device while maintaining compatibility with a user terminal according to an embodiment of the present invention.

FIG. 5 is a conceptual diagram illustrating another structure of a sub frame that may transmit control information and data for an MTC device while maintaining compatibility with a user terminal according to an embodiment of the present invention.

Referring to FIG. 5, a horizontal direction of the sub frame 1000 denotes a time axis, and a vertical direction thereof denotes a frequency axis. The sub frame 1000 includes a predetermined number of symbols along the time axis, and occupies a predetermined bandwidth along the frequency axis. Each region of the sub frame 1000 may denote a wireless resource determined in the time and frequency domains.

A control channel 1110 of a user terminal for transmitting control information to the user terminal by a base station may be allocated to a first time domain 1100 of the sub frame 1000, and a control channel 1210 of an MTC device for transmitting control information to the MTC device by a base station and a data channel 1220 of the MTC device for transmitting data to the MTC device by the base station may be allocated to a second time domain 1200 of the sub frame 1000.

In addition, the control channel 1210 of the MTC device and the data channel 1220 of the MTC device which are allocated to the second time domain 1200 of the sub frame 1000, may be divided by a data channel 1230 of the user terminal and the FDM manner as shown in FIG. 5, and the control channel 1210 of the MTC device may be divided by the data channel 1220 of the MTC device and the FDM manner.

Meanwhile, as shown in FIG. 5, the control channel 1210 of the MTC device may be divided into a first control channel 1211 of the MTC device for transmitting control information (DL grants) about downlink resource allocation of the data channel 1220 of the MTC device, and a second control channel 1212 of the MTC device for transmitting the control information (UL grants) about uplink resource allocation of the data channel 1220 of the MTC device in a manner of TDM to thereby be allocated.

In addition, the first control channel 1211 of the MTC device may be allocated to a first slot, and the second control channel 1212 of the MTC device may be allocated to a second slot.

In addition, a boundary of the first control channel 1211 of the MTC device and the second control channel 1212 of the MTC device may be distinguished by a boundary of the first slot and the second slot, or may be distinguished by a position of a front symbol or a rear symbol in the boundary of the first and second slots.

Figure 6:
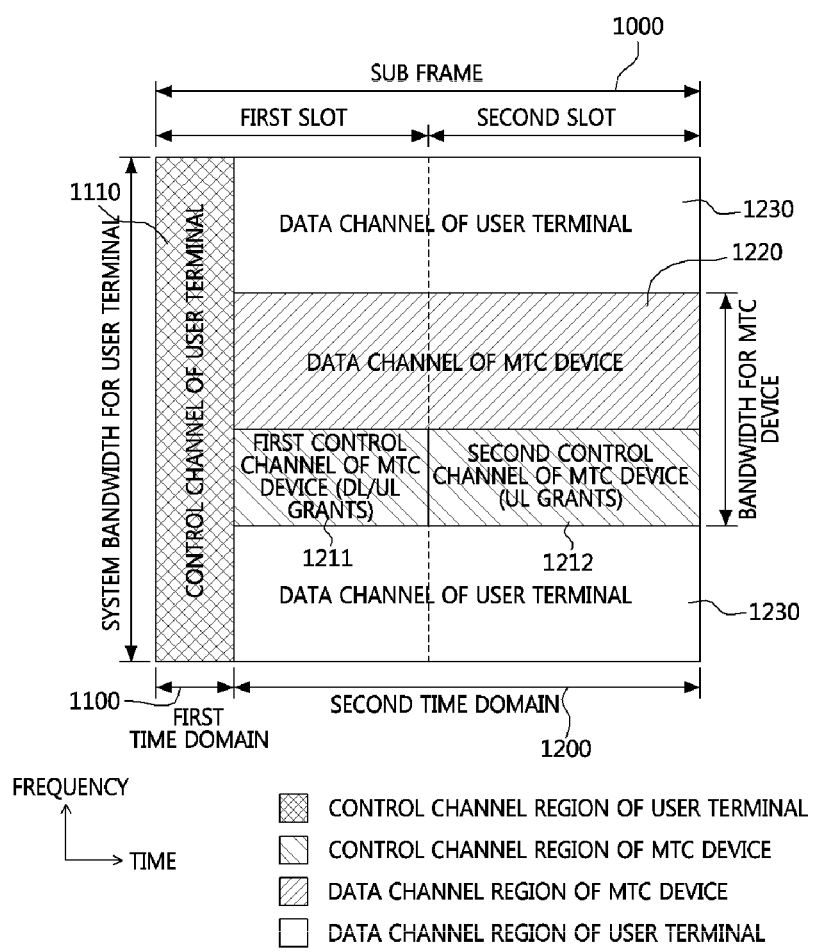
FIG. 6 is a conceptual diagram illustrating still another structure of a sub frame that may transmit control information and data for an MTC device while maintaining compatibility with a user terminal according to an embodiment of the present invention.

FIG. 6 is a conceptual diagram illustrating still another structure of a sub frame that may transmit control information and data for an MTC device while maintaining compatibility with a user terminal according to an embodiment of the present invention.

Referring to FIG. 6, a horizontal direction of the sub frame 1000 denotes a time axis, and a vertical direction thereof denotes a frequency axis. The sub frame 1000 includes a predetermined number of symbols along the time axis, and occupies a predetermined bandwidth along the frequency axis. Each region of the sub frame 1000 may denote a wireless resource determined in the time and frequency domains.

A control channel 1110 of a user terminal for transmitting control information to the user terminal by a base station may be allocated to a first time domain 1100 of the sub frame 1000, and a control channel 1210 of an MTC device for transmitting control information to the MTC device by the base station and a data channel 1220 of the MTC device for transmitting data to the MTC device by the base station may be allocated to a second time domain 1200 of the sub frame 1000.

In addition, as shown in FIG. 6, the control channel 1210 of the MTC device and the data channel 1220 of the MTC device which are allocated to the second time domain 1200 of the sub frame 1000 may be divided by a data channel 1230 of the user terminal and an FDM manner, and the control channel 1210 of the MTC device may be divided by the data channel 1220 of the MTC device and the FDM manner.

Meanwhile, as shown in FIG. 6, the control channel 1210 of the MTC device may be divided into a first control channel 1211 of the MTC device for transmitting control information (DL grants) about uplink resource allocation of the data channel 1220 of the MTC device and control information (UL grants) about uplink resource allocation of the data channel 1220 of the MTC device, and a second control channel 1212 of the MTC device for transmitting the control information (UL grants) about the uplink resource allocation of the data channel 1220 of the MTC device in a manner of TDM to thereby be allocated.

In addition, the first control channel 1211 of the MTC device may be allocated to a first slot, and the second control channel 1212 of the MTC device may be allocated to a second slot.

In addition, a boundary of the first control channel 1211 of the MTC device and the second control channel 1212 of the MTC device may be distinguished by a boundary of the first and second slots, or may be distinguished by a position of a front symbol and a rear symbol of the boundary of the first and second slots.

As shown in FIGS. 4 to 6, the control channel 1210 of the MTC device may be allocated to a predetermined region of the resource so as to transmit control information about the MTC device by a base station, and the data channel 1220 of the MTC device may be allocated to a predetermined region of the resource so as to transmit data about the MTC device, and therefore information about the region occupied by the control channel 1210 of the MTC device may be transmitted to the MTC device through semi-static signaling using upper layer signaling higher than a physical layer, transmitted to the MTC device using a broadcast channel of a user terminal for transmitting system information to a user terminal by a base station, or transmitted to the MTC device through dynamic signaling using a separate physical control channel for the MTC device.

Specifically, a state in which the information about the region occupied by the control channel 1210 of the MTC device is transmitted to the MTC device through the upper layer signaling higher than the physical layer in a case in which a base station allocates the sub frame 1000 in the same structure as that of FIG. 4, will be described with reference to the following Table 5. When a base station allocates the sub frame 1000 in the same structure as that of FIG. 1, and a final symbol position of the control channel 1210 of the MTC device is fixed and allocated to a final symbol of the first slot, the information about the region occupied by the control channel 1210 of the MTC device may be a symbol number in which the control channel 1210 of the MTC device starts.

TABLE 5

| Configuration index | Start symbol number of control channel of MTC device |
|---|---|
| 0 | 1 |
| 1 | 2 |
| 2 | 3 |
| 3 | 4 |
| • | • |

Table 5 shows an example of parameters that become the information about the region occupied by the control channel 1210 of the MTC Device which is to be transmitted to the MTC device through the upper layer signaling higher than the physical layer in the sub frame 1000 shown in FIG. 4, and the parameter may be a symbol number in which the control channel 1210 of the MTC device starts, or a confirmation index matched with the symbol number in which the control channel 1210 of the MTC device is starts.

Meanwhile, in the same manner as those of the sub frame 1000 shown in FIGS. 5 and 6, when the first control channel 1211 of the MTC device and the second control channel 1212 of the MTC device are divided by the slot, as the parameter of the upper layer signaling, a start symbol number of the first control channel 1211 of the MTC device, a start symbol number of the second control channel 1212 of the MTC device, and an end symbol number of the second control channel 1212 of the MTC, device may be used.

In addition, the configuration index matched using the start symbol number of the first control channel 1211 of the MTC device, the start symbol number of the second control channel of the MTC device, and the end symbol number of the second control channel 1212 of the MTC device may be used as the parameter of the upper layer signaling.

Meanwhile, unlike the sub frame 1000 shown in FIGS. 5 and 6, the following Table 6 shows an example of a parameter of the upper layer signaling that may be used when the first control channel 1211 of the MTC device and the second control channel 1212 of the MTC device are not divided by the slot.

TABLE 6

| Configuration index | Start symbol number of first control channel of MTC device | Start symbol number of second control channel of MTC device |
|---|---|---|
| 0 | 1 | 6 |
| 1 | 2 | 6 |
| 2 | 3 | 7 |
| 3 | 4 | 7 |
| • | • | • |

Referring to Table 6, the parameter of the upper layer signaling to be used may be a start symbol number of the first control channel 1211 of the MTC device, a start symbol number of the second control channel 1212 of the MTC device, or a configuration index in which the start symbol number of the first control channel 1211 of the MTC device and the start symbol number of the second control channel 1212 of the MTC device are matched.

Meanwhile, hereinafter, a case in which the information about the region occupied by the control channel 1210 of the MTC device is transmitted to the MTC device through dynamic signaling using a separate physical control channel for the MTC device, will be described in detail.

A base station may allocate the sub frame 1000 in the same structure as that of FIG. 4, and information about a symbol position occupied by the control channel 1210 of the MTC device that is an example of the information about the region occupied by the control channel 1210 of the MTC device may be transmitted to the MTC device through a control format indicator channel of the MTC device.

Accordingly, the MTC device may be aware that information from a symbol position where the control format indicator channel of the MTC device is detected to a final symbol position of the sub frame 1000, is the information about the region occupied by the control channel 1210 of the MTC device.

Meanwhile, the MTC device may be aware of the information about the region occupied by the control channel 1210 of the MTC device by detecting a final symbol position of the sub frame 1000 from a symbol position where the control channel 1210 of the MTC device is detected without transmitting the information about the region occupied by the control channel 1210 of the MTC device through the control format indicator channel of the MTC device.

Unlike the sub frame 1000 shown in FIG. 5 or 6, the following Table 7 shows an example of parameters that may be used as information about the region occupied by the control channel 1210 of the MTC device when the first control channel 1211 of the MTC device and the second control channel 1212 of the MTC device are not divided by the slot.

TABLE 7

| Configuration index | The number of symbols occupied by first control channel of MTC device | The number of symbols occupied by second control channel of MTC device |
|---|---|---|
| 0 | 1 | 1 |
| 1 | 1 | 2 |
| 2 | 1 | 3 |
| 3 | 2 | 1 |
| 4 | 2 | 2 |
| 5 | 2 | 3 |
| 6 | 3 | 1 |
| 7 | 3 | 2 |
| 8 | 3 | 3 |
| . | . | . |

Referring to Table 7, information about a symbol position occupied by the control channel 1210 of the MTC device that is an example of the information about the region occupied by the control channel 1210 of the MTC device, may be transmitted to the MTC device through the control format indicator channel of the MTC device.

Specifically, the MTC device may be aware of the symbol position occupied by the control channel 1210 of the MTC device through the transmission of the control formation indicator channel of the MTC device including the number of symbols occupied by the first control channel 1211 of the MTC device, the end symbol number of the first control channel 1211 of the MTC device and the number of symbols occupied by the second control channel 1212 of the MTC device, or the end symbol number of the second control channel 1212 of the MTC device.

In addition, the MTC device may be aware of the symbol position occupied by the control channel 1210 of the MTC device through the transmission of the control format indicator channel of the MTC device including the configuration index in which the number of symbols occupied by the first control channel 1211 of the MTC device and the number of symbols occupied by the second control channel 1212 of the MTC device are matched.

Meanwhile, when the second control channel 1212 of the MTC device for transmitting control information (UL grants) about uplink resource allocation of the data channel 1220 of the MTC device in the sub frame 1000 shown in FIG. 5 or 6 exists, and the first control channel 1211 of the MTC device for transmitting control information (DL grants) about downlink resource allocation of the data channel 1220 of the MTC device does not exist, allocated resources for the MTC device other than the second control channel 1212 of the MTC device may be allocated to a region for the user terminal.

In addition, when the first control channel 1211 of the MTC device (see FIG. 5) for transmitting the control information (DL grants) about the downlink resource allocation of the data channel 1220 of the MTC device in the sub frame 1000 shown in FIG. 5 or 6, or the first control channel 1211 of the MTC device (see FIG. 6) for transmitting the control information (DL grants) about the downlink resource allocation of the data channel 1220 of the MTC device and the control information (UL grants) about the uplink resource allocation of the data channel 1220 of the MTC device exists, and the second control channel 1212 of the MTC device for transmitting the control information (UL grants) about the uplink resource allocation of the data channel 1220 of the MTC device does not exist, the second control channel 1212 of the MTC device may be used as the data channel 1220 of the MTC device. Here, information that the second control channel 1212 of the MTC device is not used should be notified in such a manner that the number of symbols occupied by the second control channel 1212 of the MTC device is made zero, and then this is transmitted to the MTC device through semi-static signaling using upper layer signaling high than a physical layer. Alternatively, the information that the second control channel 1212 of the MTC device is not used may be transmitted to the MTC device using a broadcast channel of the user terminal for transmitting system information to the user terminal by a base station, or may be transmitted to the MTC device through dynamic signaling using a separate physical control channel for the MTC device.

Figure 7:
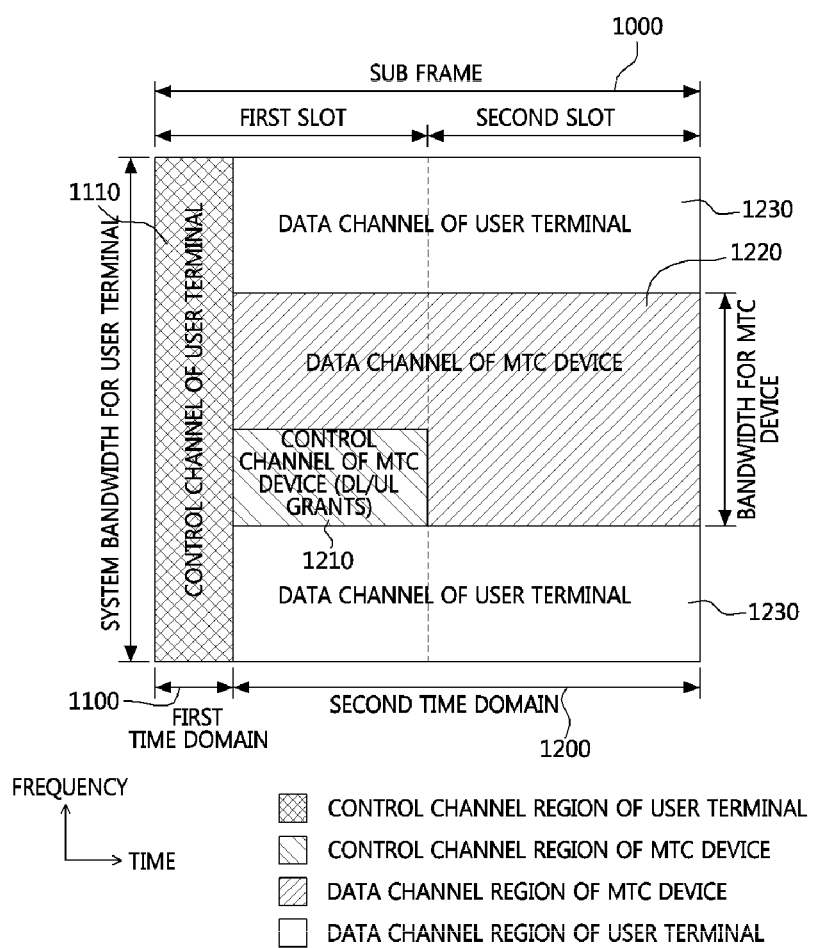
FIG. 7 is a conceptual diagram illustrating a structure of a sub frame that may transmit control information and data for an MTC device while maintaining compatibility with a user terminal according to an embodiment of the present invention.

FIG. 7 is a conceptual diagram illustrating a structure of a sub frame that may transmit control information and data for an MTC device while maintaining compatibility with a user terminal according to an embodiment of the present invention.

Referring to FIG. 7, a horizontal direction of the sub frame 1000 denotes a time axis, and a vertical direction thereof denotes a frequency axis. The sub frame 1000 includes a predetermined number of symbols along the time axis, and occupies a predetermined bandwidth along the frequency axis. Each region of the sub frame 1000 may denote a wireless resource determined in the time and frequency domains.

A control channel 1110 for a user terminal for transmitting control information to the user terminal by a base station may be allocated to a first time domain 1100 of the sub frame 1000, and a control channel 1210 of the MTC device for transmitting control information to the MTC device by the base station and a data channel 1220 of the MTC device for transmitting data to the MTC device by the base station may be allocated to a second time domain 1200 of the sub frame 1000.

In addition, the control channel 1210 of the MTC device and the data channel 1220 of the MTC device which are allocated to the second time domain 1200 of the sub frame 1000, may be divided by a data channel 1230 of a user terminal and an FDM manner, and the control channel 1210 of the MTC device may be divided by the data channel 1220 of the MTC device and a combination of TDM and FDM.

Meanwhile, as shown in FIG. 7, the control channel 1210 of the MTC device may transmit control information (DL grants) about downlink resource allocation of the data channel 1220 of the MTC device together with control information (UL grants) about uplink resource allocation of the data channel 1220 of the MTC device.

In addition, the control channel 1210 of the MTC device may be allocated to a first slot, and a boundary of the control channel 1210 of the MTC device and the data channel 1220 of the MTC device may be distinguished by a front or rear symbol position of a boundary of the first slot.

Figure 8:
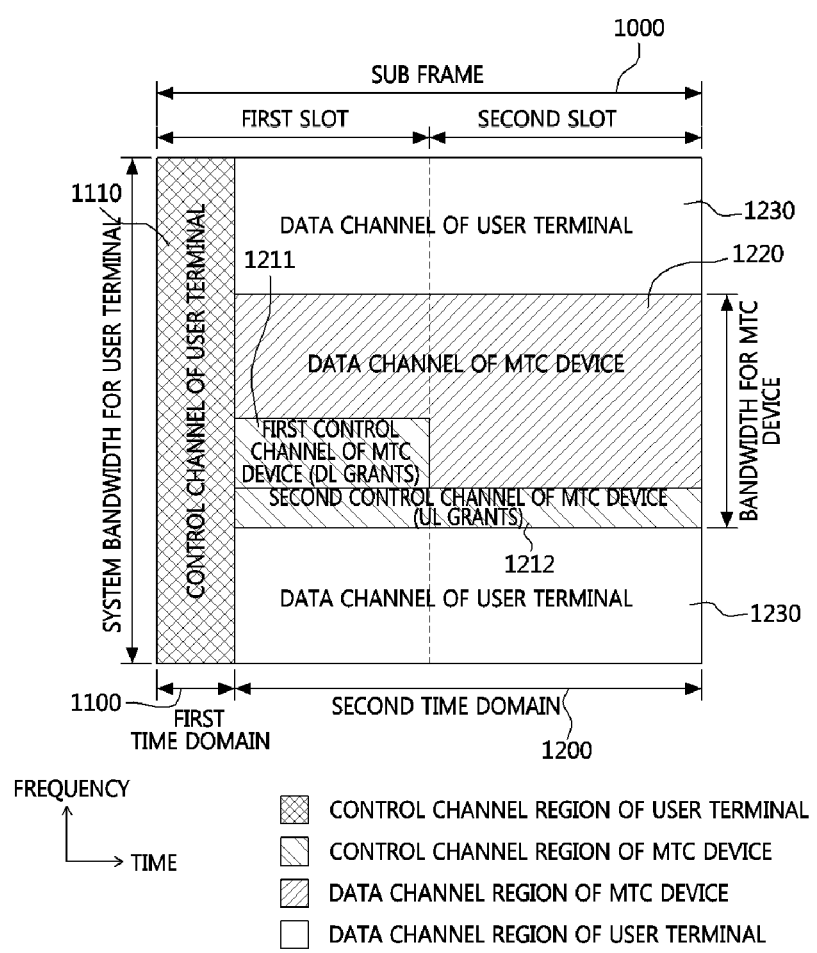
FIG. 8 is a conceptual diagram illustrating another structure of a sub frame that may transmit control information and data for an MTC device while maintaining compatibility with a user terminal according to an embodiment of the present invention.

FIG. 8 is a conceptual diagram illustrating another structure of a sub frame that may transmit control information and data for an MTC device while maintaining compatibility with a user terminal according to an embodiment of the present invention.

Referring to FIG. 8, a horizontal direction of the sub frame 1000 denotes a time axis, and a vertical direction thereof denotes a frequency axis. The sub frame 1000 includes a predetermined number of symbols along the time axis, and occupies a predetermined bandwidth along the frequency axis. Each region of the sub frame 1000 may denote a wireless resource determined in the time and frequency domains.

A control channel 1110 of a user terminal for transmitting control information to the user terminal by a base station may be allocated to a first time domain 1100 of the sub frame 1000, and a control channel 1210 of an MTC device for transmitting control information to the MTC device by the base station and a data channel 1220 of the MTC device for transmitting data to the MTC device by the base station may be allocated to a second time domain 1200 of the sub frame 1000.

In addition, the control channel 1210 of the MTC device and the data channel 1220 of the MTC device which are allocated to the second time domain 1200 of the sub frame 1000, may be divided by a data channel 1230 for the user terminal and an FDM manner.

Meanwhile, the control channel 1210 of the MTC device may include a first control channel 1211 of the MTC device for transmitting control information (DL grants) about downlink resource allocation of the data channel 1220 of the MTC device, and a second control channel 1212 of the MTC device for transmitting control information (UL grants) about uplink resource allocation of the data channel 1220 of the MTC device.

As shown in FIG. 8, the first control channel 1211 of the MTC device may be divided by the data channel 1220 of the MTC device and a combination of TDM and FDM.

In addition, the second control channel 1212 of the MTC device may be divided by the data channel 1220 of the MTC device and an FDM manner.

In addition, the first control channel 1211 of the MTC device may be allocated to a first slot, and a boundary of the first control channel 1211 of the MTC device and the data channel 1220 of the MTC device may be distinguished by a front or rear symbol position of a boundary of the first slot.

As shown in FIG. 7 or 8, the base station may allocate the control channel 1210 of the MTC device to a predetermined region of the resource so as to transmit control information about the MTC device, and allocate the data channel 1220 of the MTC device to a predetermined region of the resource so as to transmit data about the MTC device, and therefore information about a region occupied by the control channel 1210 of the MTC device may be transmitted to the MTC device through semi-static signaling using upper layer signaling higher than a physical layer, transmitted to the MTC device using a broadcast channel of the user terminal for transmitting system information to the user terminal by the base station, or transmitted to the MTC device through dynamic signaling using a separate physical control channel for the MTC device.

Specifically, a case in which the information about the region occupied by the control channel 1210 of the MTC device is transmitted to the MTC device through the upper layer signaling higher than the physical layer, will be described herein. That is, the base station may allocate the sub frame 1000 in the same structure as that of FIG. 7 or 8, and the information about a symbol position occupied by the control channel 1210 of the MTC device may be transmitted to the MTC device through the upper layer signaling.

The following Table 8 shows an example of parameters that may become information about the region occupied by the control channel 1210 of the MTC device through the upper layer signaling in FIG. 7 or 8.

TABLE 8

| Configuration index | Start symbol number of control channel of MTC device | End symbol number of control channel of MTC device |
|---|---|---|
| 0 | 1 | 5 |
| 1 | 2 | 6 |
| 2 | 3 | 7 |
| 3 | 4 | 7 |
| . | . | . |

Referring to Table 8, as parameters of the upper layer signaling, at least one of a start symbol number (a start symbol number of the first control channel 1211 of the MTC device in FIG. 8) of the control channel 1210 of the MTC device, an end symbol number (an end symbol number of the first control channel 1211 of the MTC device in FIG. 8) of the control channel 1210 of the MTC device, and a configuration index in which the start symbol number (a start symbol number of the first control channel 1211 of the MTC device in FIG. 8) of the control channel 1210 of the MTC device and the end symbol number (the end symbol number of the first control channel 1211 of the MTC device in FIG. 8) of the control channel 1210 of the MTC device are matched, may be used.

In addition, when a final symbol position of the control channel 1210 of the MTC device of FIG. 7 or a final symbol position of the first control channel 1211 of the MTC device of FIG. 8 is allocated to a final symbol position of a first slot, the start symbol number of the control channel 1210 of the MTC device of FIG. 7 or the start symbol number of the first control channel 1211 of the MTC device of FIG. 8 may be used as the parameter of the upper layer signaling, and the start symbol number of the second control channel 1212 of the MTC device of FIG. 8 is made the same as the start symbol number of the first control channel 1211 of the MTC device to thereby be used.

Accordingly, a base station may allocate the sub frame 1000 in the same manner as that of FIG. 7 or FIG. 8, and provide, to the MTC device, information about a region occupied by the control channel 1210 of the MTC device through the upper layer signaling higher than a physical layer.

Meanwhile, hereinafter, a case in which the information about the region occupied by the control channel 1210 of the MTC device is transmitted to the MTC device through dynamic signaling using a separate physical control channel for the MTC device, will be described in detail.

A base station may allocate the sub frame 1000 in the same structure as that of FIG. 7 or FIG. 8, and provide, to the MTC device, the information about the region occupied by the control channel 1210 of the MTC device through a control format indicator channel of the MTC device including at least one of the number of symbols occupied by the control channel 1210 of the MTC device, the end symbol number of the control channel 1210 of the MTC device, and a configuration index matched with the number of symbols occupied by the control channel 1210 of the MTC device.

TABLE 9

| Configuration index | The number of symbols occupied by control channel of MTC device |
| --- | --- |
| 0 | 1 |
| 1 | 2 |
| 2 | 3 |
| 3 | 4 |
| . | . |

Table 9 shows an example of parameters that may become information about the region occupied by the control channel 1210 of the MTC device of FIG. 7 or FIG. 8, which may be transmitted through the control format indicator channel of the MTC device.

Meanwhile, when a final symbol position of the control channel 1210 of the MTC device or a final symbol position of the first control channel 1211 of the MTC device is fixed and allocated to a final symbol of the first symbol, the information about the region occupied by the control channel 1210 of the MTC device may be known by detecting the final symbol position of the first slot from a symbol position where the control channel 1210 of the MTC device is detected without transmitting the information about the region occupied by the control channel 1210 of the MTC device through the control format indicator channel of the MTC device.

Meanwhile, when the second control channel 1212 of the MTC device for transmitting control information (UL grants) about uplink resource allocation of the data channel 1220 of the MTC device exists in the sub frame 1000 shown in FIG. 8, and the first control channel 1211 of the MTC device for transmitting control information (DL grants) about downlink resource allocation of the data channel 1220 of the MTC device does not exist, allocated resources for the MTC device other than the second control channel 1212 of the MTC device may be allocated to a region for a user terminal.

In addition, when the first control channel 1211 of the MTC device for transmitting the control information (DL grants) about the downlink resource allocation of the data channel 1220 of the MTC device exists in the sub frame 1000 shown in FIG. 8, and the second control channel 1212 of the MTC device for transmitting the control information (UL grants) about the uplink resource allocation of the data channel 1220 of the MTC device does not exist, the second control channel 1212 of the MTC device may be used as the data channel 1220 of the MTC device.

Here, information that the second control channel 1212 is not used should be notified in such a manner that the number of symbols occupied by the second control channel 1212 of the MTC device is made zero, and then this is transmitted to the MTC device through semi-static signaling using upper layer signaling higher than a physical layer. Alternatively, the information about that the second control channel 1212 is not used may be transmitted to the MTC device using a broadcast channel of a user terminal for transmitting system information to the user terminal by a base station, or may be transmitted to the MTC device through dynamic signaling using a separate physical control channel for the MTC device.

Figure 9:
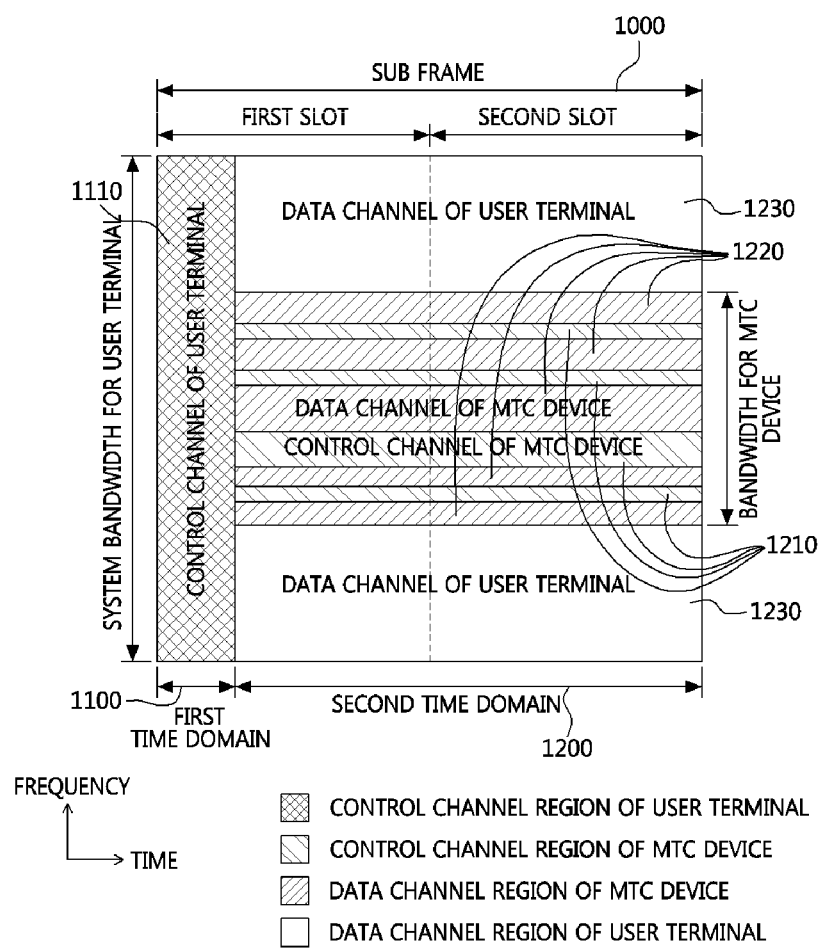
FIG. 9 is a conceptual diagram illustrating still another structure of a sub frame that may transmit control information and data for an MTC device while maintaining compatibility with a user terminal according to an embodiment of the present invention.

FIG. 9 is a conceptual diagram illustrating still another structure of a sub frame that may transmit control information and data for an MTC device while maintaining compatibility with a user terminal according to an embodiment of the present invention.

Referring to FIG. 9, a horizontal direction of a sub frame 1000 denotes a time axis, and a vertical direction thereof denotes a frequency axis. The sub frame 1000 includes a predetermined number of symbols along the time axis, and occupies a predetermined bandwidth along the frequency axis. Here, each region of the sub frame 1000 may denote a wireless resource determined in time and frequency domains.

A control channel 1110 of a user terminal for transmitting control information to the user terminal by a base station may be allocated to a first time domain 1100 of the sub frame 1000, and a control channel 1210 of an MTC device for transmitting control information to an MTC device by a base station and a data channel 1220 of the MTC device for transmitting data to the MTC device by the base station may be allocated to a second time domain of the sub frame 1000.

In addition, the control channel 1210 of the MTC device and the data channel 1220 of the MTC device which are allocated to the second time domain 1200 of the sub frame 1000, may be divided by a data channel 1230 of a user terminal and an FDM manner.

In addition, the control channel 1210 of the MTC device may be divided by the data channel 1220 of the MTC device and the FDM manner.

As shown in FIG. 9, a base station may allocate the control channel 1210 of the MTC device to a predetermined region of the resource so as to transmit control information about the MTC device by a base station, and allocate the data channel 1220 of the MTC device to a predetermined region of the resource so as to transmit data about the MTC device, and therefore information about the region occupied by the control channel 1210 of the MTC device may be transmitted to the MTC device through semi-static signaling using upper layer signaling higher than a physical layer, transmitted to the MTC device using a broadcast channel of a user terminal for transmitting system information to a user terminal by a base station, or transmitted to the MTC device through dynamic signaling using a separate physical control channel for the MTC device.

Consequently, as described in FIGS. 1 to 9, the control channel 1210 of the MTC device may be allocated to the predetermined region of the resource so as to transmit the control information about the MTC device by the base station, and the data channel 1220 of the MTC device for transmitting the data about the MTC device may be allocated to the predetermined region of the resource, and therefore information about the region occupied by the control channel 1210 of the MTC device, information about resource allocation type, bitmap information, or the like, may be transmitted to the MTC device through semi-static signaling using the upper layer signaling higher than a physical layer, or transmitted to the MTC device using the broadcast channel of the user terminal for transmitting system information to the user terminal by the base station, or transmitted to the MTC device using the dynamic signaling using the separate physical control channel for the MTC device.

Each bit of the bitmap information is a unit of resource blocks (RBs) or a unit in which the resource blocks are grouped, and may notify information as to whether a corresponding resource block or a resource in which corresponding resource blocks are grouped, is used for resource allocation of the control channel 1210 of the MTC device.

In addition, the information about the resource allocation type may denote information as to which resource allocation method the control channel 1210 of the MTC device uses.

Meanwhile, as described in FIGS. 4 to 9, when the control channel 1210 of the MTC device and the data channel 1220 of the MTC device are divided by an FDM manner or a combination of the FDM and TDM, at least one of the number of resource blocks in a frequency domain occupied by the control channel 1210 of the MTC device, the number of subcarriers, the number of groups when a plurality of resource blocks or a plurality of subcarriers are grouped, may be transmitted to the MTC device through the upper layer signaling.

In addition, as described in FIGS. 4 to 9, when the control channel 1210 of the MTC device and the data channel 1220 of the MTC device are divided by the FDM or a combination of the FDM and the TDM, at least one of the number of resource blocks in a frequency domain occupied by the control channel 1210 of the MTC device, the number of subcarriers, the number of groups when a plurality of resource blocks or a plurality of subcarriers are grouped, may be transmitted to the MTC device through a control format indicator channel of the MTC device.

TABLE 10

| Configuration index | The number of RB occupied by control channel of MTC device |
|---|---|
| 0 | 1 |
| 1 | 2 |
| 2 | 3 |
| 3 | 4 |
| • | • |

Table 10 shows an example of parameters that may be used as information about the region occupied by the control channel 1210 of the MTC device when the control channel 1210 of the MTC device and the data channel 1220 of the MTC device are divided by the FDM manner or the combination of FDM and TDM as described in FIGS. 4 to 9.

Accordingly, the base station may transmit, to the MTC device, at least one of information about the number of resource blocks in a frequency domain occupied by the control channel 1210 of the MTC device and a configuration index matched with the number of resource blocks in the frequency domain through the control format indicator channel of the MTC device, and therefore the MTC device may be aware of information about a region occupied by the control channel 1210 of the MTC device.

In addition, at least one of information about a symbol position in a time domain occupied by the control channel 1210 of the MTC device, and information about the number of resource blocks in the frequency domain may be included in the control format indicator channel of the MTC device, and the control format indicator channel may be transmitted to the MTC device.

Meanwhile, as a unit A for resource allocation of the control channel 1210 of the MTC device, a group of resource elements including available N resource elements except for a resource element (RE) that is used for transmitting a reference signal (RS) in a single symbol within a single resource block, may be used. In addition, another unit B including M groups in unit A may be used, and indexes (for example, an index in unit A and an index in unit B) with respect to each of the above described units may be used for resource allocation.

Specifically, a symbol index may be used as an index in a time domain for resource allocation of the control channel 1210 of the MTC device, and at least one of a subcarrier index as a frequency resource index in the frequency domain, a resource block index, an index of a group including a plurality of subcarriers, and an index of a group including a plurality of resource blocks, may be used.

Meanwhile, the allocated control channel 1210 of the MTC device may be scrambled using a predetermined scrambling code, and the scrambled control channel of the MTC device may be symbol-modulated using a predetermined method such as quadrature phase shift keying (QPSK) or quadrature amplitude modulation (QAM). Thereafter, the symbol-modulated control channel may be subjected to a layer mapping and pre-coding, and be mapped in a time-frequency resource domain to thereby be modulated.

In addition, downlink control information (DCI) for the MTC device may be one or a plurality of DCIs from an upper layer higher than a physical layer. Here, each of the DCIs may be a set of bits, and a single DCI may be transmitted through a single control channel of the MTC device.

Specifically, bits with respect to a single DCI may be scrambled through a predetermined scrambling code, symbol-modulated using a predetermined method such as QPSK or QAM, subjected to a layer mapping and pre-coding, mapped in a time-frequency resource domain, modulated into a single control channel of the MTC device, and thereby be allocated to the allocated control channel 1210 of the MTC device.

In addition, bits including all DCIs to be transmitted through the control channel of the MTC device in a corresponding sub frame may be all scrambled through a predetermined scrambling code, symbol-modulated using a predetermined method such as QPSK or QAM, subjected to a layer mapping and pre-coding, mapped in a time-frequency resource domain, modulated into a single control channel of the MTC device, and thereby be allocated to the allocated control channel of the MTC device.

Meanwhile, hereinafter, a method in which the allocated control channel of the MTC device is mapped in a time-frequency resource domain will be described.

Resources of the frequency domain in the time-frequency resources allocated to the control channel of the MTC device may be first mapped, and then resources of the time domain may be mapped.

Specifically, resources may be mapped starting from a start symbol index in the time domain of the allocated control channel of the MTC device and a start frequency resource index in the frequency domain to an end frequency resource index of the control channel of the MTC allocated by increasing a frequency resource index in the frequency domain, and then the resources may be mapped using the above-described method in a next symbol index of the start symbol index in the time domain to thereby be allocated up to a final symbol of the allocated control channel of the MTC device.

In addition, the resources of the time domain in the time-frequency resource allocated to the control channel of the MTC device may be first mapped, and then the resources of the frequency domain may be mapped.

Specifically, resources may be mapped starting from the start symbol index of the time domain of the allocated control channel of the MTC device and the start frequency resource index of the frequency domain to the end symbol index of the control channel of the MTC device allocated by increasing the symbol index of the time domain, and then the resources may be mapped using the above-described method in the next frequency resource index of the start frequency resource index in the frequency domain to thereby be allocated up to the final frequency resource index of the allocated control channel of the MTC device.

Meanwhile, an additional control channel other than the control channel of the MTC device for the MTC device may be allocated to a region of the control channel of the MTC device, and in this case, the control channel of the MTC device may be allocated to the remaining region excluding a region occupied by the additional control channel.

Figure 10:
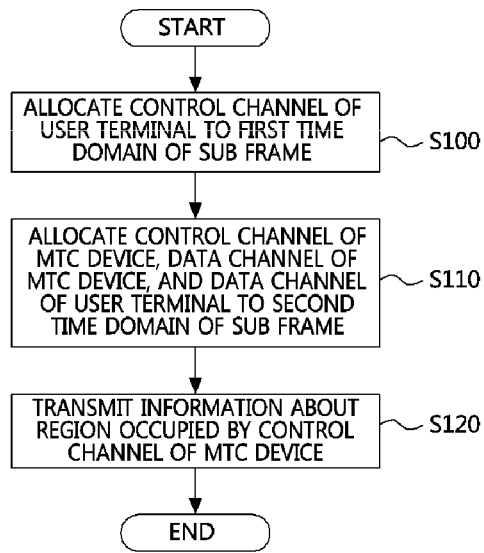
FIG. 10 is a flowchart illustrating a resource allocation method for at least one MTC device while maintaining compatibility with a user terminal according to an embodiment of the present invention.

FIG. 10 is a flowchart illustrating a resource allocation method for at least one MTC device while maintaining compatibility with a user terminal according to an embodiment of the present invention.

Referring to FIG. 10, in step S100, the resource allocation method for the MTC device may include allocating a control channel with respect to a user terminal to a first time domain of a sub frame. In step S110, the resource allocation method may include mixing and allocating at least one of a control channel with respect to at least one MTC device, a data channel with respect to a user terminal, and a data channel with respect to the MTC device in a second time domain of the sub frame.

Specifically, in step S110, the control channel with respect to the MTC device and the data channel with respect to the MTC device may be allocated to the sub frame so as to be divided by a data channel with respect to the user terminal and an FDM manner, and the control channel with respect to the MTC device may be allocated to the sub frame so as to be divided by the data channel with respect to the MTC device and at least one of a TDM manner, the FDM manner, and a combination of TDM and FDM.

Next, in step S120, information about a region occupied by the control channel with respect to the MTC device may be transmitted to the MTC device.

Specifically, in step S120, the information about the region occupied by the control channel with respect to the MTC device may be transmitted to at least one MTC device through any one of upper layer signaling higher than a physical layer, a broadcast channel with respect to the user terminal for transmitting system information to the user terminal, and a separate physical control channel for the MTC device.

Here, the separate physical control channel for the MTC device may be the broadcast channel with respect to the MTC device for transmitting the system information to the MTC device, or a control format indicator channel of the MTC device.

Here, the information about the region occupied by the control channel with respect to the MTC device may include at least one of a start symbol number of the control channel with respect to the MTC device, an end symbol number of the control channel with respect to the MTC device, a start symbol number of the data channel with respect to the MTC device, the number of symbols occupied by the control channel with respect to the MTC device, the number of resource blocks occupied by the control channel with respect to the MTC device, the number of subcarriers occupied by the control channel with respect to the MTC device, the number of subcarrier groups occupied by the control channel with respect to the MTC device, the number of resource block groups occupied by the control channel with respect to the MTC device, and a configuration index.

Figure 11:
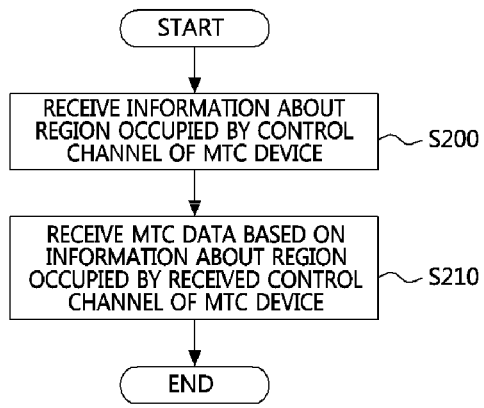
FIG. 11 is a flowchart illustrating a method for receiving MTC data while maintaining compatibility with a user terminal according to an embodiment of the present invention.

FIG. 11 is a flowchart illustrating a method for receiving MTC data while maintaining compatibility with a user terminal according to an embodiment of the present invention.

Referring to FIG. 11, in step S200, the method for receiving the MTC data may include receiving information about a region occupied by a control channel with respect to the MTC device through any one of upper layer signaling higher than a physical layer, a broadcast channel with respect to the user terminal for transmitting system information to the user terminal from the base station, and a separate physical control channel for the MTC device. In step S210, the method may include receiving the MTC data based on the information about the region occupied by the control channel with respect to the MTC device.

Here, the information about the region occupied by the control channel with respect to the MTC device may be at least one of a start symbol number of the control channel with respect to the MTC device, an end symbol number of the control channel with respect to the MTC device, a start symbol number of the data channel with respect to the MTC device, the number of symbols occupied by the control channel with respect to the MTC device, the number of resource blocks occupied by the control channel with respect to the MTC device, the number of subcarriers occupied by the control channel with respect to the MTC device, the number of subcarrier groups occupied by the control channel with respect to the MTC device, the number of resource block groups occupied by the control channel with respect to the MTC device, and the configuration index.

Figure 12:
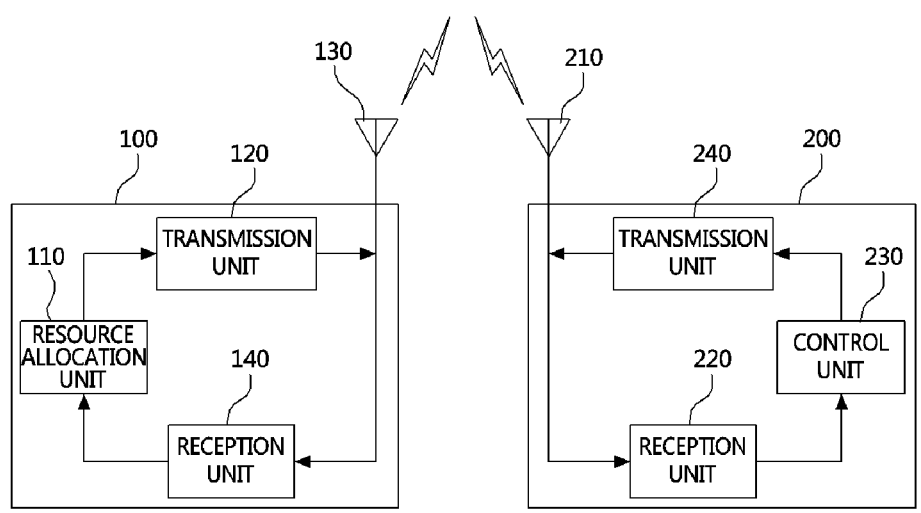
FIG. 12 is a block diagram illustrating the configuration of an apparatus for allocating resources for an MTC device, and the configuration of an apparatus for receiving MTC data according to an embodiment of the present invention.

FIG. 12 is a block diagram illustrating the configuration of an apparatus for allocating resources for an MTC device, and the configuration of an apparatus for receiving MTC data according to an embodiment of the present invention.

Referring to FIG. 12, the apparatus 100 for allocating resources for the MTC device may include a resource allocation unit 110, a transmission unit 120, an antenna 130, and a reception unit 140.

The resource allocation unit 110 may allocate a control channel with respect to a user terminal to a first time domain of a sub frame, and mix and allocate at least one of a control channel with respect to at least one MTC device, a data channel with respect to a user terminal, and a data channel with respect to an MTC device to a second time domain of the sub frame.

Specifically, the resource allocation unit 110 may divide the control channel with respect to the MTC device and the data channel with respect to the MTC device by a data channel with respect to a user terminal and an FDM manner to thereby be allocated, and divide the control channel with respect to the MTC device by the data channel with respect to the MTC device and any one of a TDM manner, an FDM manner, and a combination of TDM and FDM to thereby be allocated.

The transmission unit 120 may transmit, to at least one MTC device, information about a region occupied by the control channel with respect to the MTC device allocated in the resource allocation unit 110.

Specifically, the transmission unit may transmit, to the at least one MTC device, the information about the region occupied by the control channel with respect to the MTC device through at least one of upper layer signaling higher than a physical layer, a broadcast channel with respect to a user terminal for transmitting system information to the user terminal, and a separate physical control channel for the MTC device.

Here, the separate physical control channel for the MTC device may be the broadcast channel with respect to the MTC device for transmitting system information to the MTC device from the base station, or a control format indicator channel of the MTC device for the MTC device.

Here, the information about the region occupied by the control channel with respect to the MTC device may include at least one a start symbol number of the control channel with respect to the MTC device, an end symbol number of the control channel with respect to the MTC device, a start symbol number of the data channel with respect to the MTC device, the number of symbols occupied by the control channel with respect to the MTC device, the number of resource blocks occupied by the control channel with respect to the MTC device, the number of subcarriers occupied by the control channel with respect to the MTC device, the number of subcarrier groups occupied by the control channel with respect to the MTC device, the number of resource block groups occupied by the control channel with respect to the MTC device, and a configuration index.

The antenna 130 may include a transmission antenna that converts, into a wireless signal, the information about the region occupied by the control channel with respect to the MTC device provided from the transmission unit 120, and transmits the converted signal to the outside through a predetermined method determined in the transmission unit 120, and a reception antenna that receives the wireless signal from the outside to transmit the received signal to the reception unit. Here, when a multi-antenna (multi-input and multi-output (MIMO)) function is supported, at least two antennas 130 may be provided.

The reception unit 140 may provide, to the resource allocation unit 110, the wireless signal from at least one of the user terminal and the MTC device received through the antenna 130.

Meanwhile, an apparatus 200 for receiving MTC data may include an antenna 210, a reception unit 220, a control unit 230, and a transmission unit 240.

The antenna 210 may include a reception antenna that converts a wireless signal including the information about the region occupied by the control channel with respect to the MTC device received from the outside to thereby transmit the converted signal to the reception unit 220, and a transmission antenna that converts the signal provided from the transmission unit 240 into a wireless signal to thereby transmit the converted signal to the outside. Here, when a multi-antenna (multi-input and multi-output (MIMO)) function is supported, at least two antennas 210 may be provided.

The reception unit 220 may receive the information about the region occupied by the control channel with respect to the MTC device.

Specifically, the reception unit 220 may receive the information about the region occupied by the control channel with respect to the MTC device through any one of upper layer signaling higher than a physical layer, a broadcast channel with respect to a user terminal for transmitting system information to the user terminal, and a separate physical control channel for the MTC device.

The control unit 230 may receive MTC data based on the information about the region occupied by the control channel with respect to the MTC device provided from the reception unit 220.

The transmission unit 240 may perform a predetermined coding and modulation so as to convert a predetermined signal provided from the control unit 230 into a wireless signal, and provide the obtained wireless signal to the antenna 210.

Here, the information about the region occupied by the control channel with respect to the MTC device may include at least one of a start symbol number of the control channel with respect to the MTC device, an end symbol number of the control channel with respect to the MTC device, a start symbol number of the data channel with respect to the MTC device, the number of symbols occupied by the control channel with respect to the MTC device, the number of resource blocks occupied by the control channel with respect to the MTC device, the number of subcarriers occupied by the control channel with respect to the MTC device, the number of subcarrier groups occupied by the control channel with respect to the MTC device, the number of resource block groups occupied by the control channel with respect to the MTC device, and a configuration index.

As described above, according to the embodiments of the present invention, the resource allocation method and apparatus for the MTC device and the method and apparatus for receiving MTC data may transmit control information and data to the MTC device while maintaining compatibility with the user terminal in a wireless communication system such as a 3GPP LTE-based mobile communication system, thereby providing MTC services.

While the example embodiments of the present invention and their advantages have been described in detail, it should be understood that various changes, substitutions and alterations may be made herein without departing from the scope of the invention.

What is claimed is:

1. A method for allocating resources to at least one machine type communication (MTC) device, the method comprising:
    allocating a control channel with respect to a user terminal to a first time domain of a sub frame;
    mixing at least one of a control channel with respect to the at least one MTC device, a data channel with respect to the user terminal, and a data channel with respect to the MTC device in a second time domain of the sub frame, and allocating the mixed channel to the second time domain of the sub frame; and
    transmitting, to the MTC device, information about a region occupied by the control channel with respect to the MTC device,
    wherein the information about the region occupied by the control channel with respect to the MTC device includes at least one of a start symbol number and an end symbol number of the control channel with respect to the MTC device, a start symbol number of the data channel with respect to the MTC device, the number of symbols occupied by the control channel with respect to the MTC device, the number of resource blocks (RB), the number of subcarriers, the number of subcarrier groups, the number of resource block groups, and a configuration index.

2. The method of claim 1, wherein the control channel for the MTC device and the data channel with respect to the MTC device are divided by the data channel with respect to the user terminal in a frequency division multiplexing (FDM) manner.

3. The method of claim 2, wherein the control channel with respect to the MTC device is divided by the data channel with respect to the MTC device in any one of a time division multiplexing (TDM) manner, an FDM manner, and combination of TDM and FDM.

4. The method of claim 1, wherein the transmitting transmits the information about the region occupied by the control channel with respect to the MTC device to the at least one MTC device through any one of upper layer signaling higher than a physical layer, a broadcast channel with respect to the user terminal for transmitting system information to the user terminal, and a separate physical control channel for the MTC device.

5. An apparatus for allocating resources to at least one machine type communication (MTC) device, the apparatus comprising:
    a resource allocation unit that allocates a control channel with respect to a user terminal to a first time domain of a sub frame, mixes at least one of a control channel with respect to the at least one MTC device, a data channel with respect to the user terminal, and a data channel with respect to the MTC device in a second time domain of the sub frame, and allocates the mixed channel to the second time domain of the sub frame; and a transmission unit that transmits, to the MTC device, information about a region occupied by the control channel with respect to the MTC device, wherein the information about the region occupied by the control channel with respect to the MTC device includes at least one of a start symbol number and an end symbol number of the control channel with respect to the MTC device, a start symbol number of the data channel with respect to the MTC device, the number of symbols occupied by the control channel with respect to the MTC device, the number of resource blocks (RB), the number of subcarriers, the number of subcarrier groups, the number of resource block groups, and a configuration index, wherein the apparatus for allocating resources to at least one MTC device comprises one or more processors configured to embody a plurality of functional units of the apparatus including a resource allocation unit.

6. The apparatus of claim 5, wherein the control channel with respect to the MTC device and the data channel with respect to the MTC device are divided by the data channel with respect to the user terminal in a frequency division multiplexing (FDM) manner.

7. The apparatus of claim 6, wherein the control channel with respect to the MTC device is divided by the data channel with respect to the MTC device in any one of a time division multiplexing (TDM) manner, an FDM manner, and combination of TDM and FDM.

8. The apparatus of claim 5, wherein the transmission unit transmits the information about the region occupied by the control channel with respect to the MTC device to the at least one MTC device through any one of upper layer signaling higher than a physical layer, a broadcast channel with respect to the user terminal for transmitting system information to the user terminal, and a separate physical control channel for the MTC device.

9. A method for receiving machine type communication (MTC) data from a base station, the method comprising:

receiving information about a region occupied by a control channel with respect to an MTC device through any one of upper layer signaling higher than a physical layer, a broadcast channel with respect to a user terminal for transmitting system information from the base station to the user terminal, and a separate physical control channel for the MTC device; and receiving the MTC data based on the information about the region occupied by the control channel with respect to the MTC device, wherein the control channel with respect to the MTC device is allocated in a second time domain of a subframe as mixed with a first data channel with respect to the MTC device and a second data channel with respect to the user terminal, wherein the information about the region occupied by the control channel with respect to the MTC device includes at least one of a start symbol number and an end symbol number of the control channel with respect to the MTC device, a start symbol number of the data channel with respect to the MTC device, the number of symbols occupied by the control channel with respect to the MTC device, the number of resource blocks (RB), the number of subcarriers, the number of subcarrier groups, the number of resource block groups, and a configuration index.

10. An apparatus for receiving machine type communication (MTC) data from a base station, the apparatus comprising:

a reception unit that receives information about a region occupied by a control channel with respect to an MTC device through any one of upper layer signaling higher than a physical layer, a broadcast channel with respect to a user terminal for transmitting system information from the base station to the user terminal, and a separate physical control channel for the MTC device; and a control unit that receives the MTC data based on the information about the region occupied by the control channel with respect to the MTC device, wherein the control channel with respect to the MTC device is allocated in a second time domain of a subframe as mixed with a first data channel with respect to the MTC device and a second data channel with respect to the user terminal, wherein the information about the region occupied by the control channel with respect to the MTC device includes at least one of a start symbol number and an end symbol number of the control channel with respect to the MTC device, a start symbol number of the data channel with respect to the MTC device, the number of symbols occupied by the control channel with respect to the MTC device, the number of resource blocks (RB), the number of subcarriers, the number of subcarrier groups, the number of resource block groups, and a configuration index.

* * * * *